US012639189B2

(12) United States Patent
Mota Manhaes et al.

(10) Patent No.: US 12,639,189 B2
(45) Date of Patent: May 26, 2026

(54) SELECTING AUTOMATION SCRIPTS USING REINFORCED LEARNING

(71) Applicant: Kyndryl, Inc., New York, NY (US)

(72) Inventors: Marcelo Mota Manhaes, Curitiba (BR); Rogerio Baldini Das Neves, Belo Horizonte (BR); Sergio Varga, Campinas (BR); Igor Monteiro Vieira, Hortolandia (BR); Joao Luiz Todari, Sao Caetano do Sul (BR)

(73) Assignee: Kyndryl, Inc., New York, NY (US)

( * ) Notice: Subject to any disclaimer, the term of this patent is extended or adjusted under 35 U.S.C. 154(b) by 1085 days.

(21) Appl. No.: 17/118,671

(22) Filed: Dec. 11, 2020

(65) Prior Publication Data

US 2022/0188213 A1     Jun. 16, 2022

(51) Int. Cl.
| | |
|---|---|
| *G06F 11/34* | (2006.01) |
| *G06F 40/20* | (2020.01) |
| *G06N 5/02* | (2023.01) |
| G06F 30/20 | (2020.01) |

(52) U.S. Cl.
CPC ...... *G06F 11/3457* (2013.01); *G06F 11/3428* (2013.01); *G06F 40/20* (2020.01); *G06N 5/02* (2013.01)

(58) Field of Classification Search
CPC .. G06F 11/3457; G06F 11/3428; G06F 40/20; G06F 11/3442; G06F 11/0793; G06N 5/02; G06N 5/022; G06N 20/00
USPC .......................................................... 703/22
See application file for complete search history.

(56) References Cited

U.S. PATENT DOCUMENTS

| | | | |
|---|---|---|---|
| 8,266,592 B2 | 9/2012 | Beto et al. | |
| 8,688,676 B2 * | 4/2014 | Rush ..................... | G06F 16/907 |
| | | | 707/706 |
| 8,874,498 B2 | 10/2014 | Modha | |
| 8,972,372 B2 * | 3/2015 | Elbaum ................... | G06F 16/93 |
| | | | 717/136 |
| 9,412,075 B2 | 8/2016 | Padala et al. | |
| 10,033,406 B2 | 7/2018 | Huang et al. | |
| 10,063,406 B2 | 8/2018 | Tapia et al. | |
| 10,374,919 B2 * | 8/2019 | Pai ...................... | H04L 41/5025 |
| 10,922,357 B1 * | 2/2021 | Chennuru ........... | G06F 16/2457 |

(Continued)

FOREIGN PATENT DOCUMENTS

| | | |
|---|---|---|
| CN | 103248693 A | 8/2013 |
| CN | 105355111 A | 2/2016 |

OTHER PUBLICATIONS

Tesauro, Gerald, Nicholas K. Jong, Rajarshi Das, and Mohamed N. Bennani. "On the use of hybrid reinforcement learning for autonomic resource allocation." Cluster Computing 10 (2007): 287-299. (Year: 2007).*

(Continued)

*Primary Examiner* — Andre Pierre Louis

(74) *Attorney, Agent, or Firm* — CANTOR COLBURN LLP; Erik Swanson

(57) ABSTRACT

A system can evaluate multiple candidate scripts. The system receives a problem statement and a sample solution script. The system selects an additional script based on the sample solution script, and compiles a list of candidates including the sample and additional scripts. Then, for each of the candidates, the system simulates execution of the script and scores performance of the script. The system then presents results of the execution.

17 Claims, 7 Drawing Sheets

(56) References Cited

U.S. PATENT DOCUMENTS

| | | | | |
|---|---|---|---|---|
| 11,042,369 | B1 * | 6/2021 | Kimball | G06F 9/4843 |
| 11,580,445 | B2 * | 2/2023 | Liu | G06N 7/01 |
| 2009/0265681 | A1 | 10/2009 | Beto et al. | |
| 2013/0164727 | A1 | 6/2013 | Dzakula | |
| 2016/0063062 | A1 * | 3/2016 | Yahav | G06F 16/90335 |
| | | | | 707/769 |
| 2017/0019315 | A1 | 1/2017 | Tapia et al. | |
| 2018/0165604 | A1 * | 6/2018 | Minkin | G06Q 10/06 |
| 2022/0138240 | A1 * | 5/2022 | Bahrami | G06F 16/3332 |
| | | | | 717/120 |

OTHER PUBLICATIONS

Heo, Kihong, Woosuk Lee, Pardis Pashakhanloo, and Mayur Naik. "Effective program debloating via reinforcement learning." In Proceedings of the 2018 ACM SIGSAC Conference on Computer and Communications Security, pp. 380-394. 2018. (Year: 2018).*

Starlinger, Johannes, Sarah Cohen-Boulakia, Sanjeev Khanna, Susan B. Davidson, and Ulf Leser. "Effective and efficient similarity search in scientific workflow repositories." Future Generation Computer Systems 56 (2016): 584-594. (Year: 2016).*

Fursin, Grigori, Anton Lokhmotov, Dmitry Savenko, and Eben Upton. "A collective knowledge workflow for collaborative research into multi-objective autotuning and machine learning techniques." arXiv preprint arXiv:1801.08024 (2018). (Year: 2018).*

Battina, Dhaya Sindhu. "AI-Augmented Automation for DevOps, a Model-Based Framework for Continuous Development in Cyber-Physical Systems." International Journal of Creative Research Thoughts (IJCRT), ISSN (2016): 2320-2882. (Year: 2016).*

Saini, Vaibhav, Hitesh Sajnani, Jaewoo Kim, and Cristina Lopes. "Sourcererce and sourcererce-i: tools to detect clones in batch mode and during software development." In Proceedings of the 38th international conference on software engineering companion, pp. 597-600. 2016. (Year: 2016).*

Sajnani, Hitesh, Vaibhav Saini, Jeffrey Svajlenko, Chanchal K. Roy, and Cristina V. Lopes. "Sourcererce: Scaling code clone detection to big-code." In Proceedings of the 38th international conference on software engineering, pp. 1157-1168. 2016. (Year: 2016).*

Alici, Sadiye, Ismail Sengor Altingovde, Rifat Ozcan, Berkant Barla Cambazoglu, and Özgür Ulusoy. "Timestamp-based result cache invalidation for web search engines." In Proceedings of the 34th international ACM SIGIR conference on Research and development in Information Retrieval, pp. 973-982. 2011. (Year: 2011).*

Chen, Yan, Jaylin Herskovitz, Walter S. Lasecki, and Steve Oney. "Bashon: A Hybrid Crowd-Machine Workflow for Shell Command Synthesis." In 2020 IEEE Symposium on Visual Languages and Human-Centric Computing (VL/HCC), pp. 1-8. IEEE, 2020. (Year: 2020).*

Chakraborti, Tathagata, et al. "UbuntuWorld 1.0 LTS—a platform for automated problem solving and troubleshooting in the Ubuntu OS." In Proceedings of the AAAI Conference on Artificial Intelligence, vol. 31, No. 2, pp. 4657-4663. 2017 (Year: 2017).*

Reid, Brittany, Christoph Treude, and Markus Wagner. "Optimising the fit of stack overflow code snippets into existing code." In Proceedings of the 2020 Genetic and Evolutionary Computation Conference Companion, pp. 1945-1953. 2020. (Year: 2020).*

Zagalsky, Alexey, Ohad Barzilay, and Amiram Yehudai. "Example overflow: Using social media for code recommendation." In 2012 Third International Workshop on Recommendation Systems for Software Engineering (RSSE), pp. 38-42. IEEE, 2012. (Year: 2012).*

Greco, Chase D. "A Behavior-Driven Recommendation System for Stack Overflow Posts." Virginia Commonwealth University, Thesis (2018). Downloaded from <https://scholarscompass.vcu.edu/etd/5396> (Year: 2018).*

Dai, Ting, Alexei Karve, Grzegorz Koper, and Sai Zeng. "Automatically detecting risky scripts in infrastructure code." In Proceedings of the 11th ACM Symposium on Cloud Computing, pp. 358-371. 2020. (Year: 2020).*

Agarwal, Mayank, Jorge J. Barroso, Tathagata Chakraborti, Eli M. Dow, Kshitij Fadnis, Borja Godoy, Madhavan Pallan, and Kartik Talamadupula. "Project clai: Instrumenting the command line as a new environment for ai agents." arXiv preprint arXiv:2002.00762 (2020). (Year: 2020).*

Kim, Kisub, Dongsun Kim, Tegawendé F. Bissyandé, Eunjong Choi, Li Li, Jacques Klein, and Yves Le Traon. "FaCoY: a code-to-code search engine." In Proceedings of the 40th International Conference on Software Engineering, pp. 946-957. 2018. (Year: 2018).*

Nascimento, André, Victor Olimpio, Vitor Silva, Aline Paes, and Daniel de Oliveira. "A reinforcement learning scheduling strategy for parallel cloud-based workflows." In 2019 IEEE international parallel and distributed processing symposium workshops (IPDPSW), pp. 817-824. IEEE, 2019 (Year: 2019).*

McKeeman, William M. "Peephole optimization." Communications of the ACM 8, No. 7 (1965): 443-444. (Year: 1965).*

Massalin, Henry. "Superoptimizer: a look at the smallest program." ACM SIGARCH Computer Architecture News 15, No. 5 (1987): 122-126. (Year: 1987).*

Bansal, Sorav, and Alex Aiken. "Automatic generation of peephole superoptimizers." ACM SIGARCH Computer Architecture News 34, No. 5 (2006): 394-403. (Year: 2006).*

Schkufza, Eric, Rahul Sharma, and Alex Aiken. "Stochastic superoptimization." ACM SIGARCH Computer Architecture News 41, No. 1 (2013): 305-316. (Year: 2013).*

Bunel, Rudy, Alban Desmaison, M. Pawan Kumar, Philip HS Torr, and Pushmeet Kohli. "Learning to superoptimize programs." arXiv preprint arXiv:1611.01787 (2016). Submitted on Nov. 6, 2016 (v1), last revised Jun. 28, 2017 (this version, v3)] (Year: 2017).*

"Train Reinforcement Learning Agent in MDP Environment," MATLAB & Simulink, Jul. 16, 2020, 5 pages, https://www.mathworks.com/help/reinforcement-learning/ug/train-reinforcement-learning-agent-in-mdp-environment.html.

"System and Method for Automated Solution Identification of an Organization IT Platform Issue through Machine Learning," IP.Com, An IP.com Prior Art Database Technical Disclosure, IP.com No. IPCOM000260437D, IP.com Electronic Publication Date: Nov. 22, 2019, 6 pages, https://priorart.ip.com/IPCOM/000260437.

Agarwal et al., "Automatic problem extraction and analysis from unstructured text in IT tickets," IBM J. Res. & Dev. vol. 61 No. 1 Paper 4 Jan./Feb. 2017, 12 pages, https://ieeexplore.ieee.org/document/7877279.

"What is AI Ops and How is it Changing IT Operations," Logic Monitor, Printed Dec. 8, 2020, 5 pages https://www.logicmonitor.com/blog/what-is-aiops-and-how-is-it-changing-it-operations.

"10 good shell scripting practices," The UNIX School, Mar. 29, 2012, 6 pages https://www.theunixschool.com/2012/03/10-good-shell-scripting-practices.html.

Rowe et al., "Toward Automated Scenario Generation with Deep Reinforcement Learning in GIFT," North Carolina State University, Intelligent Automation, Inc., Printed Dec. 8, 2020, 10 pages.

Rodriguez et al., "Continuous Action Reinforcement Learning Automata," Performance and Convergence, Proceedings of the 3rd International Conference on Agents and Artificial Intelligence (ICAART-2011), pp. 473-478.

Arabnejad et al., "A Comparison of Reinforcement Learning Techniques for Fuzzy Cloud Auto-Scaling," Research Gate, May 2017, 11 pages.

"IBM Watson AIOps," An AI-powered IT incident resolution application fueled by your own data, printed Dec. 8, 2020, 5 pages.

* cited by examiner

200

Receive Problem Statement
202

Receive Sample Solution Scripts
204

Find Scripts Similar to Sample
206

Select Found Scripts Based on Similarity
208

Compile List of Candidate Solution Scripts
(Including Sample Scripts and Selected Scripts)
210

SELECTING AUTOMATION SCRIPTS USING REINFORCED LEARNING

BACKGROUND

The present disclosure relates to automation. More specifically, the present disclosure relates to improved selection of automation scripts.

In recent years, many fields have seen increasing use of automated scripts to perform various tasks. One notable example is in Information Technology (IT); an emerging area known as "AIOps" (Artificial intelligence for IT Operations) leverages Artificial Intelligence (AI) to enhance IT operations. For example, AIOps uses Big Data, machine learning and advanced analytics to help IT teams predict, find, and fix issues faster.

SUMMARY

Some embodiments of the present disclosure can be illustrated as a method. The method comprises receiving a problem statement. The method further comprises receiving a sample solution script. The method further comprises selecting a solution script based on the sample solution script. The method further comprises compiling a list of candidate scripts including the sample solution script and the selected solution script. The method further comprises identifying execution rules of each of the candidate scripts. The method further comprises simulating execution of each of the candidate scripts based on the execution rules. The method further comprises scoring each of the candidate scripts based on the simulating and the execution rules, resulting in scored candidate scripts. The method further comprises presenting the scored candidate scripts.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
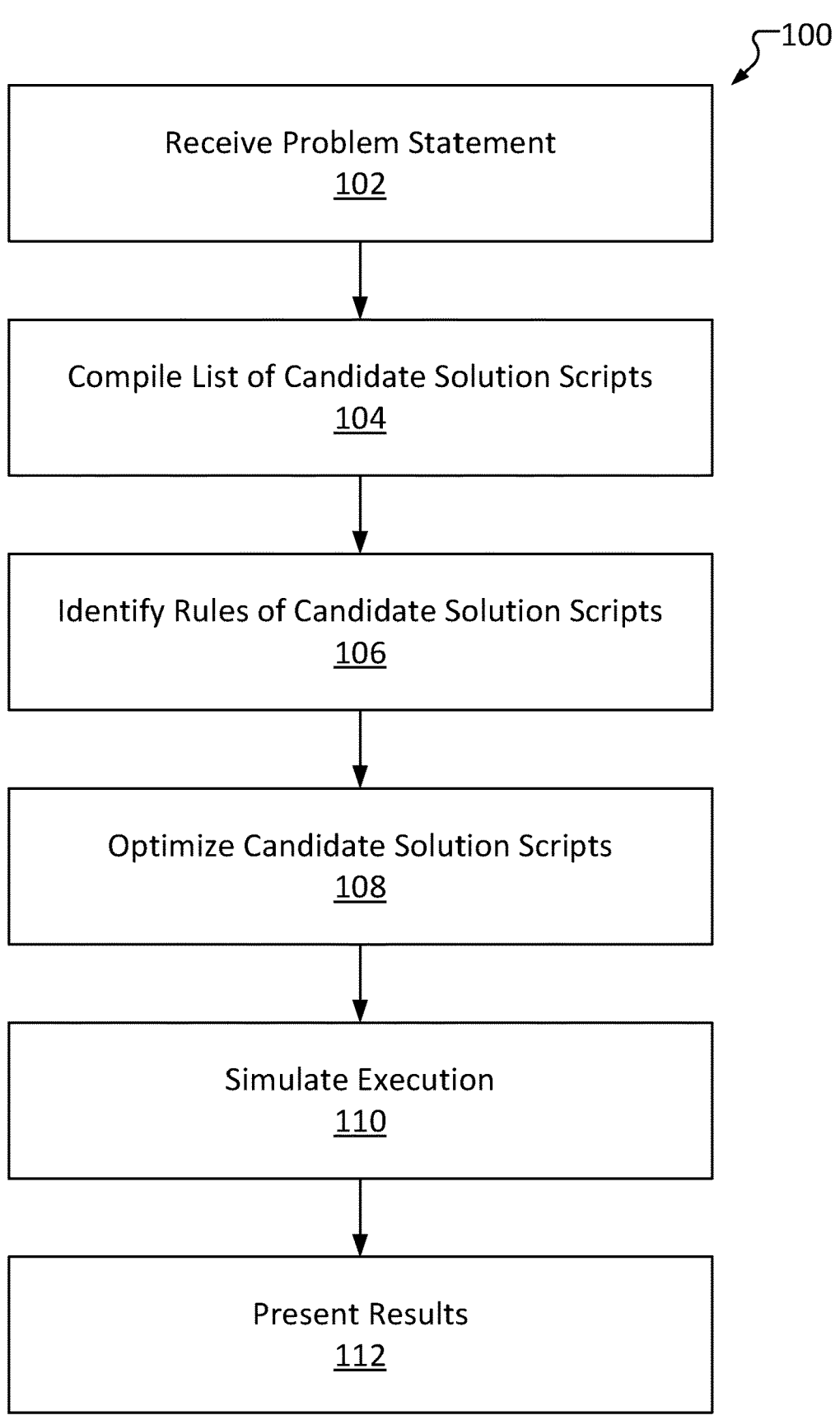
FIG. 1 is a high-level automation script selection method, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to select automation scripts. More particular aspects relate to a system to receive a problem statement, generate a list of solution scripts, simulate execution of the solution scripts, evaluate performance of the solution scripts, and select a solution script for execution.

Throughout this disclosure, reference is made to problems being addressed by various kinds of scripts. A "script," as used herein, refers to a program or set of instructions that can be executed by a computer (such as via a central processing unit (CPU)) to perform a given task. As used herein, "solution scripts" refer to scripts that, when executed, may resolve, mitigate, or otherwise address corresponding problems. Problems can include, for example, a file system being full, a connection being lost, data being corrupted, and the like. Scripts are often used in the context of automation; an automation script may execute automatically in response to detecting a particular state. For example, an automation script may be developed to monitor for a "file system full" problem where, upon detecting a file system being full, the automation script may automatically move a portion of the stored files to a backup in order to free up storage space.

As automation scripts become increasingly commonplace, more entities (particularly, but not exclusively, businesses) face the challenge of developing, testing, and implementing their own scripts for their specific use cases. Systems and methods consistent with the present disclosure advantageously improve the development workflow for such scripts by leveraging reinforced learning and natural language processing (NLP) techniques to select, optimize, and compare various candidate scripts. This can assist a subject matter expert (SME) in developing and selecting a script for a given task.

As used herein, a "sample" solution script refers to a solution script that a user, such as an SME, may be considering implementing to address a given problem. For example, sample solution scripts (referred to as "sample scripts" for brevity) can include scripts which the user has successfully utilized in the past, such as when addressing a similar problem. Sample scripts can also include solution scripts that the user may not have specifically implemented in the past, but is currently considering, such as a solution script that the user has personally developed or found elsewhere.

Sample scripts are a subset of "candidate" scripts. Candidate solution scripts are solution scripts that systems and methods consistent with the present disclosure may evaluate and/or compare, including both sample scripts input by a user as well as scripts selected from external resources ("selected scripts"), such as the internet. As an illustrative example of these terms, a user may input "sample" scripts, a system may search one or more websites to identify "selected" scripts; the combined set of sample and selected scripts is referred to as a list of candidate scripts. Systems and methods consistent with the present disclosure may compile, present, evaluate, and compare a list of candidate scripts, enabling a user to make an informed decision of which solution script to implement.

FIG. 1 is a high-level automation script selection method 100, consistent with several embodiments of the present disclosure. Method 100 comprises receiving a problem statement at operation 102. Operation 102 may include, for example, receiving an input from a user. The problem statement may include a set of problem criteria used to identify a given problem. As an example, a problem statement may be "file system full," with problem criteria relating to a remaining storage capacity of a file system. For example, the problem criteria may describe a threshold of remaining capacity below which the file system is considered full. Operation 102 may further include determining one or more "solution criteria," which include conditions that, upon being met, indicate that the problem has been resolved.

Method 100 further comprises compiling a list of solution scripts at operation 104. A solution script, as referred to herein, is a program (such as an automation program) that, when executed, has a relatively high chance of solving the problem described at operation 102. Operation 104 may be performed in a variety of ways, as discussed in further detail below with reference to method 200 of FIG. 2. As an overview, operation 104 may include acquiring solution scripts from various sources such as user input or a knowledge base (such as the internet), and compiling them in a list to evaluate. In some embodiments, operation 104 may also include presenting a preliminary list of solution scripts to a user, enabling the user to "veto" scripts or otherwise modify the list; in such embodiments, the "compiled" list refers to the modified list.

Method 100 further comprises identifying execution rules of candidate solution scripts at operation 106. Operation 106 may include identifying various thresholds and/or boundaries associated with actions and commands that may be performed during execution of the solution scripts. As an example, a solution script included in the list compiled at operation 104 may include one or more "wait" commands. Operation 106 may include identifying a maximum allowable time associated with the "wait" command such as, for example, thirty seconds. In some use cases, every instance of a command may have its own threshold. For example, a first "wait" command may have a first maximum allowable time of five seconds, a second "wait" command may have a second maximum allowable time of seven seconds, while a third "wait" command may also have a maximum allowable time of five seconds. Further, a "global" maximum allowable time may also be identified, monitored, and enforced. For example, a "global" maximum allowable time may be thirty seconds, such that, regardless of individual maximum allowable times for each instance of the "wait" command, if the total time waited exceeds thirty seconds, the global execution rule was violated.

Different types of commands may have different execution rules. For example, while a "wait" command may have an execution rule enforcing a maximum time, a "write" command may have an execution rule enforcing a maximum amount of written data. In some use cases, all commands of a given type (e.g., wait, write, etc.) may share a common threshold. Operation 106 may include identifying the execution rules for each script based on user input and/or knowledge base search results. As an example, a user may manually enter that a "wait" command should have a maximum wait time of 5 seconds. As an additional example, an online database of scripts may indicate that 5 seconds is a preferable maximum wait time for a "wait" command. These execution rules are useful for evaluating performance of the various scripts against one another, as described in further detail below.

Method 100 further comprises optimizing the candidate solution scripts at operation 108. Operation 108 may include modifying scripts by replacing certain commands with preferred alternative commands that are projected to be more effective at the given task. For example, a system performing method 100 may compile a list of commands in each script and compare the commands to a command mapping database (populated via a knowledge base). Based on this comparison, the system may identify a preferred alternative command associated with the first command. The system may then replace the first command with the preferred alternative command (e.g., by removing the first command from the script and inserting the preferred alternative command into the script), thus "optimizing" the script. Examples of optimization are discussed in further detail below with reference to method 300 of FIG. 3. Operation 108 may include performing optimization operations for each script in the list of scripts.

Method 100 further comprises simulating execution of the scripts at operation 110. Operation 110 may include, for example, cloning or otherwise replicating a production environment and causing execution of the scripts in the replicated environment. Operation 110 may implement reinforced learning techniques in order to better identify effectiveness of each simulated script. An example implementation of reinforced learning techniques is described in further detail below with reference to FIG. 5.

Method 100 further comprises presenting results at operation 112. Operation 112 may include, for example, generating a table listing various solution scripts along with scores rating effectiveness of each script. Method 100, via operation 112, may enable a user such as a subject matter expert (SME) to make a quick and informed selection of an automation solution script.

Figure 2:
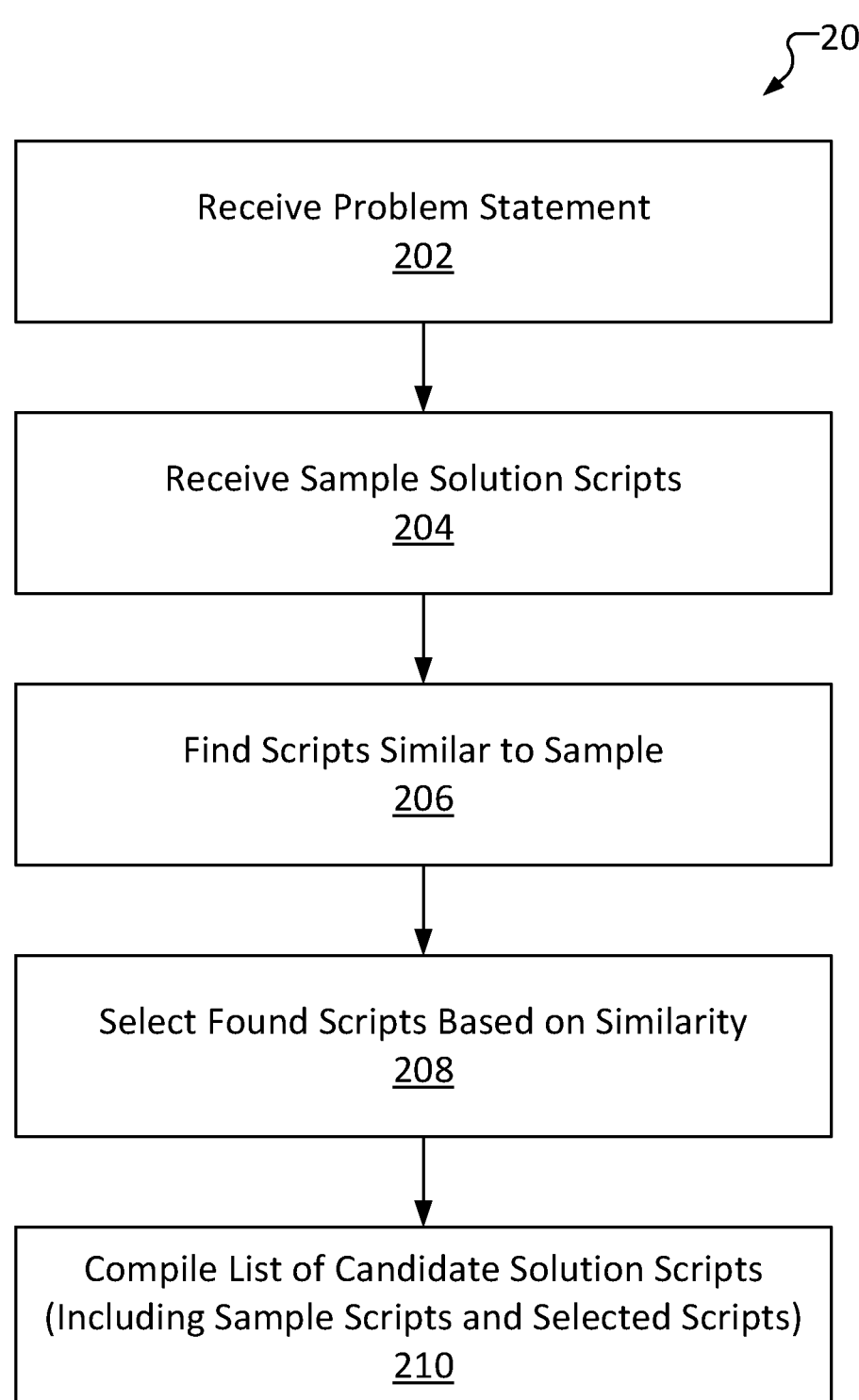
FIG. 2 is an example method of compiling a list of solution scripts, consistent with several embodiments of the present disclosure.

FIG. 2 illustrates an example method 200 of compiling a list of solution scripts, consistent with several embodiments of the present disclosure. Method 200 comprises receiving a problem statement at operation 202. Operation 202 may be performed in a manner substantially similar to that of operation 102 discussed with reference to method 100 of FIG. 1, above. In some instances, operation 202 may include receiving one or more keywords describing or summarizing the problem. Keywords can be indicated by the user when entering the problem statement, such as by selecting from a list, entering them manually, etc.

Method 200 further comprises receiving sample solution scripts at operation 204. Sample solution scripts may be input by a user. For example, a user inputting a problem statement may be prompted by a system performing method 200 to input one or more solution scripts that the user is considering, that the user has implemented in the past, etc.

Method 200 further comprises finding solution scripts that are similar to the sample solution script(s) at operation 206. Operation 206 may include, for example, implementing one or more natural language processing (NLP) techniques such as a "bag-of-words" model, term frequency-inverse document frequency (TF-IDF), word vectorization, etc., in conjunction with a knowledge base to search various internet technical sites for solution scripts that share features with the sample solution scripts.

As a simplified example, a sample solution script received from a user may perform a first command, then a second command, and finally a third command. An online database may include scripts used in various industries for various purposes. Operation 206 may include searching the online database for scripts that perform two of the three commands in the same relative order. As a result of this search, a system performing method 200 may find a script that performs the first command, then the second command, and finally a fourth command. Scripts identified as a result of the search of operation 206 are referred to as "found" scripts.

The search may be informed by information contained in a knowledge base. For example, the knowledge base may include a list of technical resources, such as websites, viable for searching, so a system performing method 200 may restrict its search to resources included on the list (the opposite approach, i.e., a list of resources that may not be used, is also considered). In some embodiments, aspects of the problem statement (such as, for example, problem criteria) may also be leveraged in the search. For example, a system performing method 200 may include one or more keywords identified in the problem statement in a search query. In response to the search, a system performing method 200 may receive a set of "found scripts."

Method 200 further comprises selecting one or more of the set of found scripts at operation 208. Found scripts may be selected based on their similarity. Operation 208 may include, for example, calculating a "similarity score" for each found script, and selecting a predetermined number of found scripts based on their similarity score (for example, the top three). As an example, a first script and a second script may be identical except for a single command (meaning the first script may include a first command where the second script includes a second command). Such a pair of scripts may have a relatively high similarity score. In contrast, a pair of scripts that do not have any commands in common may have a relatively low similarity score.

The knowledge base may also be leveraged in script selection as well as searching. For example, the knowledge base may include a list or ranking of commands that are so ubiquitous as to be unhelpful for comparative purposes. For example, commands associated with receiving input variables or generating an output (e.g., read, write, etc.) may be found in most scripts, so even a strong match between an online script and a sample solution script based on such commands may not actually be useful. Thus, as an example, a search may yield two found scripts similar to a sample script. Operation 208 may including leveraging information within the knowledge base to determine that the first found script is a better candidate than the second found script, and thus may include selecting the first found script.

In some instances, operation 208 may include selecting found scripts based on a number of sample scripts. For example, a system may receive X sample scripts and select Y found scripts, where X+Y=Z (Z being a predetermined size of a candidate script list).

In some embodiments, aspects of the problem statement (such as, for example, problem criteria) may also be leveraged in the selection. For example, operation 208 may include searching comments, variable names, and/or surrounding context of found scripts (e.g., webpage titles, description text, etc.) for keywords identified in the problem statement. Presence of such keywords may impact a similarity score of corresponding found scripts.

Method 200 further comprises compiling a list of candidate solution scripts at operation 210. Operation 210 may include, for example, generating an array or similar data structure including all sample scripts and selected scripts. In some embodiments, operation 210 may also include presenting a "preliminary" list of candidate scripts to a user for review; the user may opt to manually remove (or, in some instances, add) one or more candidate scripts, resulting in modification of the list. For purposes of this disclosure, such a modified list is still referred to herein as the list of candidate scripts. Once compiled via method 200, the list of candidate scripts may then be optimized and evaluated, as discussed in further detail below.

Figure 3:
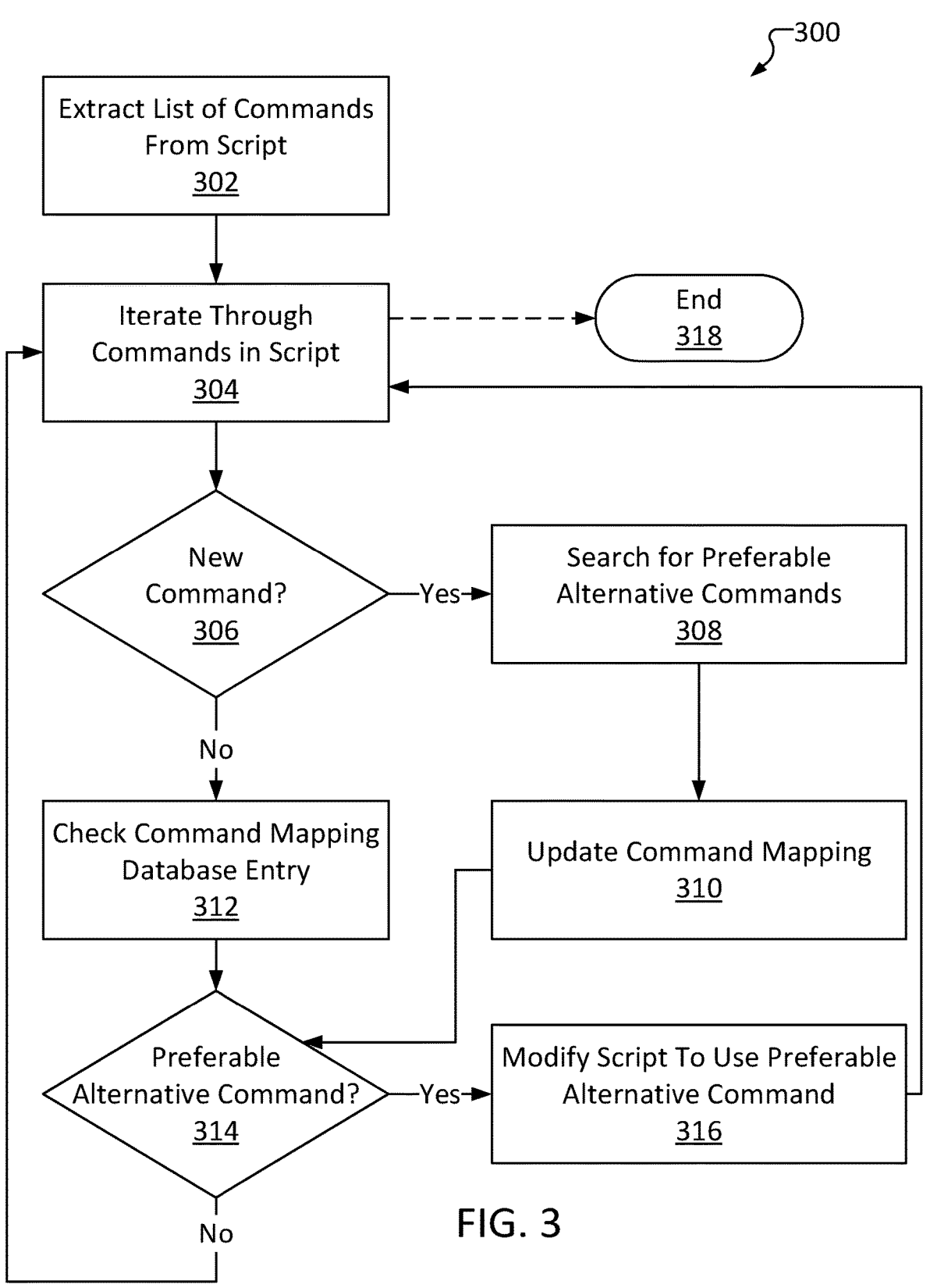
FIG. 3 is a script optimization method, consistent with several embodiments of the present disclosure.

FIG. 3 is a script optimization method 300, consistent with several embodiments of the present disclosure. Method 300 may be performed on each of a list of candidate scripts. In general, method 300 may determine whether a candidate script aligns with "best practices" and, if not, modify the script so that it does.

Method 300 comprises extracting commands from a candidate script at operation 302. Operation 302 may include, for example, analyzing a candidate script and generating a list of commands included in the script. Method 300 further includes iterating through commands in the script at operation 304; for example, a first instance of operation 304 may include selecting a first command of the list of commands as a "current" or "selected" command.

A system performing method 300 may include a "command mapping database," or a data structure including a list of commands as well as corresponding alternative commands that may be considered to be best practice or otherwise superior. For example, a candidate script may include a first command (e.g., "echo"). The command mapping database may indicate that a second command (e.g., "printf") fulfills essentially the same purpose as the first command, but is generally preferred in the industry. For example, the second command may consume fewer computing resources when executed, the second command may be simpler to use or understand, etc. As method 300 iterates through commands in a given script (and as a system performs method 300 for each candidate script), the command mapping database is updated as new commands are encountered.

Thus, method 300 further comprises determining whether the current command is a "new" command (meaning a command that is not yet in the command mapping database) at operation 306. Operation 306 may include, for example, checking the current command against a list of commands included in the command mapping database.

If the current command is a new command (306 "Yes"), method 300 further comprises searching for preferable alternative commands at operation 308. Operation 308 may include, for example, querying various internet sources and/or a knowledge base and analyzing results (via NLP) to determine whether any preferable alternative commands exist. As an example, a candidate script may include a first command, and a system performing method 300 may determine that the first command is a new command in block 306 (i.e., the first command may not be listed in the command mapping). Further, a knowledge base of the system may indicate that a first website is a source of valid information. Operation 308 may thus include searching the first website for the first command and leveraging one or more NLP techniques upon search results to determine that a second command may perform the same function as the first command, but more efficiently. In another example, the candidate script may also include a third command, and the system may determine that the third command is also a new command. However, the first website may not indicate any preferable alternatives to the third command.

Method 300 further comprises updating the command mapping at operation 310. Operation 310 may include adding entries to the command mapping data structure corresponding to the new command and any identified preferable alternative commands (or a lack thereof). Returning to the previous examples, operation 310 may include updating the command mapping to reflect that the second command is a preferable alternative to the first command and that, while the third command is no longer "new," no preferable alternative command has been found.

If the command is not a new command (306 "No"), then it is included in the command mapping database, and method 300 further comprises checking the command mapping database entry at operation 312. Operation 312 may include reading an entry of the command mapping database corresponding to the current command identified at operation 306.

Once the command mapping has been updated (via operation 310) or checked (via operation 312) for the current command, method 300 further comprises determining, at operation 314, whether a preferable alternative command has been identified. A "preferable" alternative command may be a command that, for example, performs the same function as a listed command, but more efficiently. For example, operation 314 may include determining whether an alternative command is known based on operation 312 or was found in operation 308. As another example, a preferable alternative command may be a command that performs the same function as the listed command, but is generally identified in the art as superior.

If a preferable alternative command is identified (314 "Yes"), method 300 further comprises modifying the candidate script to include the preferable alternative command at operation 316. Operation 316 may include, for example, replacing a command with the alternative command. In some instances, additional changes to the script may be required in order to incorporate the new command. As an example, the alternative command may produce an output that is formatted in a different manner from that of the original command. Thus, operation 316 may include automatically adjusting other aspects of the script in order to properly incorporate the alternative command, such as by converting the output into an expected format. As an example, a first command may output a temperature in degrees Fahrenheit, while a preferable alternative command may output the temperature in Kelvin. A third command may depend upon the output temperature being input in Fahrenheit. Thus, operation 316 may include replacing the first command with the second command, but also automatically converting the output of the second command into Fahrenheit so as to successfully integrate the second command into the script (by resolving a potential conflict with the third command). Method 300 may result in performing operation 316 multiple times for various different commands. In view of this, and to prevent unnecessary/redundant changes, in some embodiments, operation 316 may defer making changes until all commands are checked; for example, operation 316 may include determining changes that are necessary to implement the alternative command and, rather than performing those changes immediately, adding the changes to a list to be performed once all commands are checked. Once the changes are made (or added to the list), method 300 returns to operation 304 to select another command from the list of commands included in the candidate script.

If no preferable alternative command is identified (314 "No"), method 300 returns to operation 304 (without modifying the command/script) to select another command from the list of commands included in the candidate script. Once all commands have been checked and any changes made to incorporate alternative commands, method 300 ends at 318.

Figure 4:
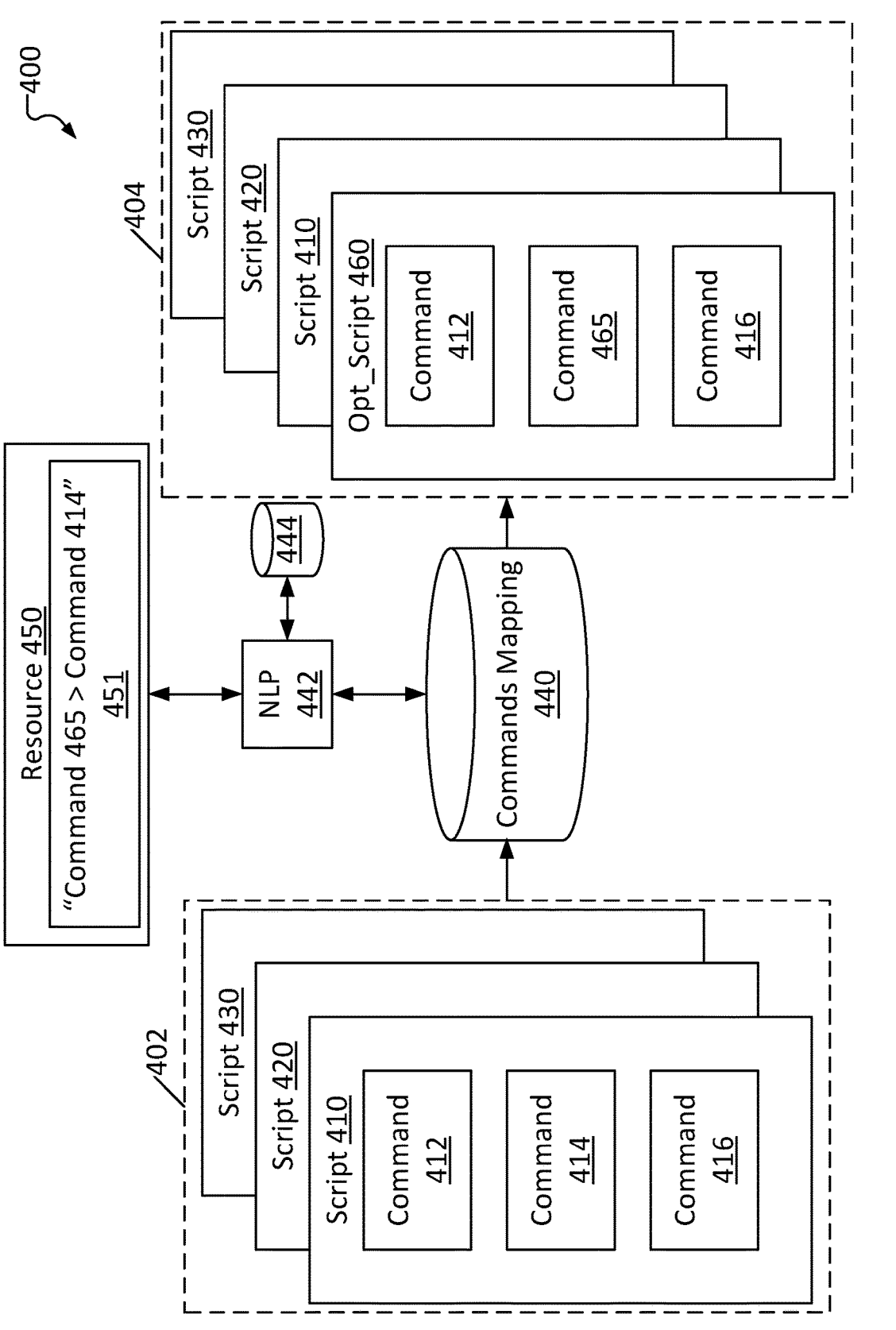
FIG. 4 is a diagram depicting an example of script optimization, consistent with several embodiments of the present disclosure.

FIG. 4 is a diagram 400 depicting an example of script optimization, consistent with several embodiments of the present disclosure. Diagram 400 includes a first set of candidate scripts 402, including first script 410, second script 420, and third script 430. Some of scripts 402 may be sample scripts input by a user, while others may be selected scripts acquired from an external source, such as an internet database. Each of scripts 402 includes various commands to be executed in order to perform the script's function. For example, script 410 includes first command 412, second command 414, and third command 416.

Each of scripts 402 may be "optimized" by checking for alternative commands via commands mapping 440. This may be performed in a manner similar to method 300 as discussed with reference to FIG. 3, above. For example, a list of commands may be extracted from script 410. The list of commands may include first command 412, second command 414, and third command 416. Each of these commands may be checked against a commands mapping database 440. Commands mapping database 440 may include entries for some or all of commands 412-416, listing known alternative commands, if any are known. For example, commands mapping database 440 may contain an entry for command 412 indicating that no alternative command is known.

However, if commands mapping database 440 does not include an entry for a given command, a search may be performed. For example, commands mapping database 440 may not contain an entry for command 414 or command 416. Thus, a system may search one or more external sources for information regarding command 414. The system may utilize Natural Language Processing 442 in order to perform the search. The search may be performed based on information contained in knowledge base 444. For example, knowledge base 444 may include attributes describing command 414 such as a programming language of command 414, a level of technical complexity of command 414, etc. Knowledge base 444 may also include a list of external resources that may yield particularly useful results based on command attributes; for example, based on the information stored in knowledge base 444, a system may determine that resource 450 has a relatively high chance of including alternative commands corresponding to command 414. Thus, the system may submit a search query to resource 450.

Resource 450 may be, for example, a website, online database, forum, etc. The system may leverage NLP 442 in order to search resource 450 and interpret results. As a result of the search, NLP 442 may identify a statement 451 found in resource 450. Statement 451 indicates that a fourth command 465 is generally considered superior to command 414 by those of skill in the art. This information may be returned to commands mapping database 440, and an entry may be created in commands mapping database 440 mapping command 414 to command 465. In some instances, multiple resources may be queried for a single command. However, in the interest of brevity, only a single resource (resource 450) is depicted and discussed herein.

As an additional example, commands mapping database 440 may not include an entry for command 416. Thus, a system may perform a search, leveraging NLP 442 and knowledge base 444. The search may again be submitted to resource 450 (though different resources are also possible). However, this search may return no alternative commands. Thus, the system may create an entry in commands mapping database 440 indicating that, while command 416 has been searched, no alternative commands have been identified (similar to the entry for command 412). This may result in improved efficiency over time; for example, if script 420 also includes command 416, the entry added to commands mapping database 440 will eliminate the need for a redundant search. In some embodiments, entries may be time-stamped, and updated if a preset amount of time has elapsed since the timestamp. This may advantageously enable keeping commands mapping database 440 relatively up to date with the state of the art while simultaneously minimizing resources wasted on redundant searches.

Once all of commands 412-416 have been checked, the system may generate an optimized script 460. Optimized script 460 may be substantially similar to script 410 (e.g., commands 412 and 416 may remain unaffected), but command 414 may have been replaced with command 465. Due to command 465 being considered best practice by those skilled in the art, optimized script 460 may comprise a superior candidate script when compared to script 410. Thus, optimized script 460 may be included in a second, optimized set of candidate scripts 404.

Notably, scripts 404 may still include script 410. This can mitigate a risk of error. For example, while optimized script 460 may have improved performance over script 410 in general, automatic implementation of command 465 into optimized script 460 may in some instances result in decreased performance (or failure). This could be due to an error in resource 450, in the manner of implementation (e.g., a format mismatch), and the like. While such errors may be relatively unlikely, in some particularly failure-sensitive use cases, the additional resources required to evaluate script 410 in addition to optimized script 460 may be considered worthwhile. However, in some instances, scripts 404 may omit script 410 in favor of optimized script 460.

Figure 5:
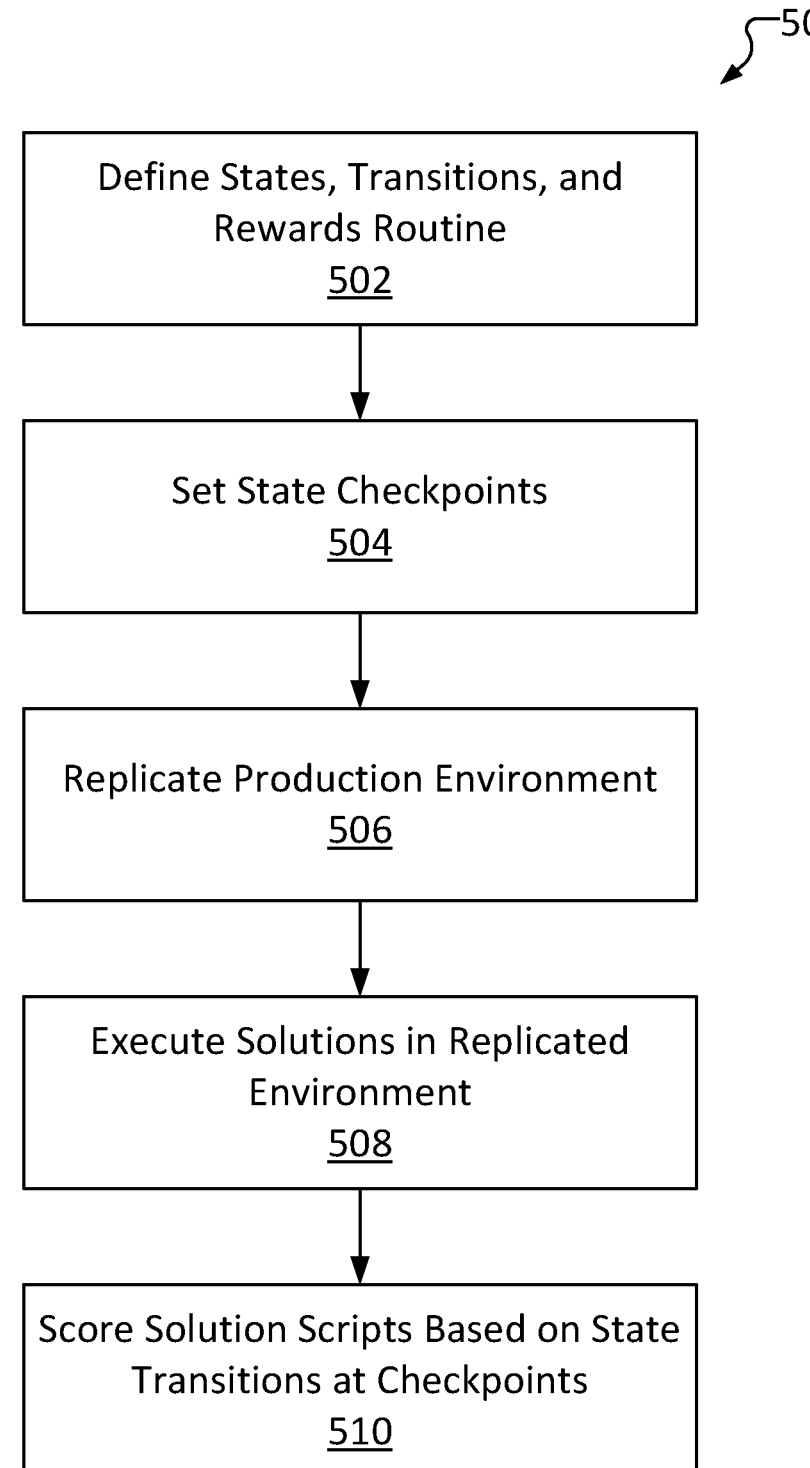
FIG. 5 is a script evaluation method using reinforced learning, consistent with several embodiments of the present disclosure.

FIG. 5 is a script evaluation method 500 using reinforced learning, consistent with several embodiments of the present disclosure. Method 500 comprises defining a routine that includes states, transitions between the states, and rewards associated with the transitions at operation 502. The routine will be used as a framework to evaluate performance of a script as it transits between states during execution of the script. An example routine is provided in FIG. 6, discussed in detail below.

As an overview, operation 502 includes defining a set of states, such as, for example, "waiting," "running," and "completed." Operation 502 also includes defining transitions between the states. For example, a script in the "running" state may undergo a transition to the "waiting" state; this transition may be labeled as "wait." The routine uses a point-based score system to evaluate performance of various scripts; for example, points may be deducted from a script's score for every transition the script performs, and the script with the highest score may be considered to have performed the best. In view of this, operation 502 also includes assigning rewards to the various transitions. For example, the "wait" transition (from "running" to "waiting") may be assigned a "reward" of −2, such that a script that ceases running loses 2 points. Rewards may be positive or negative. In some embodiments, all rewards may be negative.

Method 500 further comprises setting state checkpoints at operation 504. Operation 504 may include, for example, selecting points within a candidate script at which to check a state of the script. Checkpoints may be set based upon commands in the script; for example, operation 504 may include setting a first checkpoint immediately before a first command and a second checkpoint immediately after a second command. With such a setup, during execution of the script, a system may check a state of the script (i.e., at the first checkpoint) prior to executing the first command, then execute the first command, then execute the second command, and finally check the state of the script again (i.e., at the second checkpoint). Checking a state of a script may be performed by, for example, submitting a query to an operating system (OS) within which the script is executing, or submitting a query to the script itself. The state may be returned as a response to the query. In some instances, the state can be evaluated based upon analysis; for example, a script may output its state at given intervals, enabling checking the state of the script based upon reading the most recent state output.

In general, executing several commands without checking a state increases a chance that a state change will be missed. However, each checkpoint will increase computational overhead of executing (and, thus, evaluating) the script. Thus, a system performing method 500 may attempt to balance performance with scrutiny by setting checkpoints surrounding commands that are most likely to result in a state change. Operation 504 may include leveraging a knowledge base and/or external resource to identify commands that are particularly likely to result in a state change. In some instances, a preset number (or range) of checkpoints may be set in each candidate script in an attempt to standardize the evaluation process so as to further enable comparing scripts to one another.

In some instances, a state may be checked between execution of every command. However, this may result in a significant performance penalty and/or resource cost. Thus, usage of checkpoints via operation 504 may enable monitoring of state changes (and thus performance) of a script with reduced computational overhead.

Method 500 further comprises replicating a production environment at operation 506. Operation 506 may include, for example, "cloning" or otherwise simulating an environment in which a solution script will be executed. Operation 506 may enable evaluating performance of a solution script in a realistic, standardized environment. Further, operation 506 may reduce a risk to stability of an existing system associated with executing untested scripts.

Method 500 further comprises executing the candidate solution script in the replicated environment at operation 508. Operation 508 may include, for example, executing the various commands included in the script. Operation 508 may further include checking (and updating) a state of the script upon encountering checkpoints set at operation 504. Operation 508 may include enforcing one or more execution rules associated with the script during execution. For example, a first script may be associated with a first execution rule enforcing a maximum wait time. When executing the first script, a system performing method 500 may monitor a total wait time elapsed. Should the wait time exceed the maximum outline by the execution rule, operation 508 may include terminating execution of the script.

Method 500 further comprises scoring the script based upon detected state transitions at operation 510. For example, during execution, if a state check (prompted by a checkpoint) reveals that the script has undergone a first transition, operation 510 may include determining a reward associated with the first transition, and adjusting a score of the script according to the reward.

In some embodiments, operation 510 may include adjusting the score based on a final outcome; for example, if the script failed or crashed, operation 508 may include setting the score associated with the script to a special "failed" value. However, in some embodiments, failure can be accounted for via a significant score penalty in the rewards routine defined at operation 502, as in the example provided below in FIG. 6.

Figure 6:
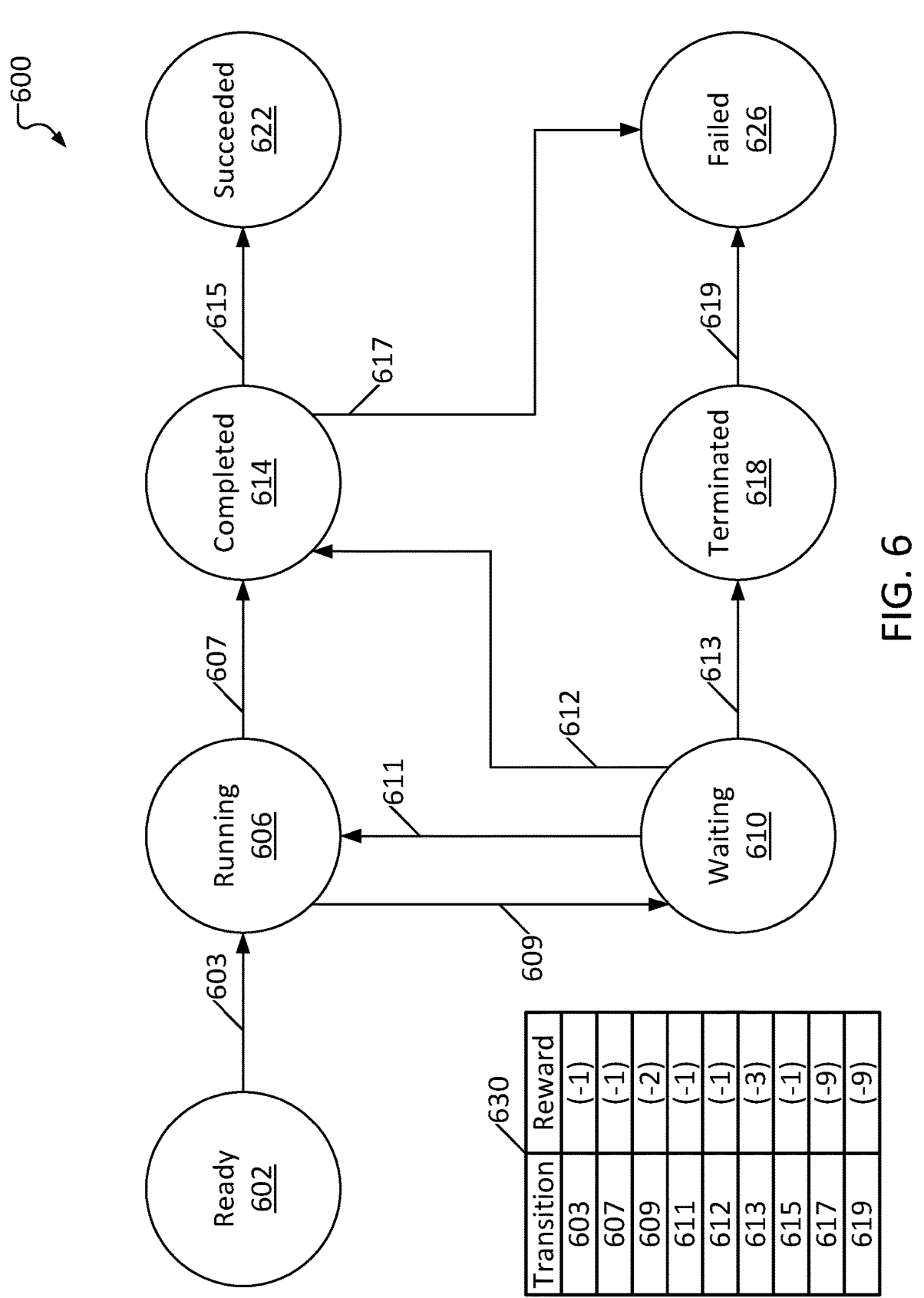
FIG. 6 is a diagram of an example state transition and reward routine for use in reinforced learning, consistent with several embodiments of the present disclosure.

FIG. 6 is a diagram of an example state-transition-reward routine 600 for use in reinforced learning, consistent with several embodiments of the present disclosure. Routine 600 includes 7 defined states: A "Ready" state 602, a "Running" state 606, a "Waiting" state 610, a "Completed" state 614, a "Terminated" state 618, a "Succeeded" state 622, and a "Failed" state 626. A script to be evaluated is assumed to begin in the "Ready" state 602.

Routine 600 further includes defined transitions between several of the states, each transition having an associated reward. For example, a script may undergo transition 603 (from "Ready" 602 to "Running" 606). Transition 603 may be associated with a "reward" of (−1), so a script would lose a single point upon completing the transition. Similarly, the script may then undergo transition 607 (from "Running" 606 to "Completed" 614), which may also be associated with a reward of (−1). Rewards may be positive or negative. In some embodiments, all rewards may be negative. A table 630 of example rewards is also provided in FIG. 6.

Upon a script reaching the "Completed" state 614, the script may be evaluated for success or failure. This evaluation may include, for example, determining whether an indicated problem has been resolved (such as by determining whether one or more solution criteria have been met). If the problem has been resolved, the script is considered "Succeeded" 622 via transition 615, associated with a reward of (−1). If the script has completed without resolving the problem, then it has "Failed" 626, associated with a reward of (−9). As an example, a first script may undergo transitions 603, 609, 612, and 607, representing a script going from "Ready" 602 to "Running" 606, from "Running" 606 to "Waiting" 610, from "Waiting" 610 to "Completed" 614, and from "Completed" 614 to "Succeeded" 622, respectively. This first script encountered a "wait" issue, which may generally result in a lower score of $(-1)+(-2)+(-1)+(-1)=(-5)$, compared to the maximum possible score of (−4).

If a script is in the "waiting" state 610 for a long enough period of time, the script may be automatically "Terminated" 618 via transition 613, associated with a reward of (−3). A "Terminated" script may be automatically assumed to have "Failed" 626, represented by transaction 619 including an additional reward of (−9).

In general, transitions 617 and 619 may be scored such that a script may be heavily penalized for failure. As an example, a second script may undergo transitions 603 and 607, resulting in a "completed" script with no intervening "Waiting" 610. However, the second script may not have resolved the problem, and thus the second script "Failed" 626 via transition 617. Therefore, even though the script completed without waiting, the second script may receive a final score of $(-1)+(-1)+(-9)=(-11)$.

As discussed above, a script's state checkpoints may be set such that a system evaluating the script does not detect a state transition. For example, a third script may begin execution, wherein it is assuming to be in the "Ready" state 602. The system may then execute a first command, resulting in transition 603, which results in the state being in the "Running" state 606. The script may then execute a second command, resulting in transition 607 such that the state is in the "Completed" state 614. The system may then detect a state checkpoint, and check a state of the script. This results in the system detecting that the state is in "Completed" state 614.

However, the system may never have detected the script in the "Running" state 606. Further, no transition exists between "Ready" 602 and "Completed" 614. In view of this, in order to score the script, the system may assume one or more state transitions have occurred in between the start of execution and the first checkpoint (or, in other instances, in between two sequential checkpoints). In some embodiments, the system may assume the "best-case" scenario for the script, meaning the series of transitions yielding the highest score. In this example, the "best-case" scenario would be transition 603 followed by transition 607, resulting in a score of $(-1)+(-1)=(-2)$. As a counterexample, the script could have gone from "Ready" 602 to "Running" 606 via 603, then from "Running" 606 to "Waiting" 610 via 609, and then from "Waiting" 610 to "Completed" 614 via 612. The total score for this second path is $(-1)+(-2)+(-1)=(-4)$. Since the first path has a higher score, the system may assume the first path when scoring the script. Other assumption schemes are also considered, such as, for example, the shortest possible path (e.g., a valid path having the fewest transitions, regardless of score).

A "worst-case" scenario assumption may not be defined for some state transitions in routine 600, as transition 609 and transition 611 create a loop. In other words, a script that repeatedly transits between "running" and "waiting" may earn a repeatedly decreasing score. This loop also introduces a possibility of a successful script scoring worse than a failed script. For example, a fourth script may transition from "Ready" 602 to "Running" 606 via transition 603, resulting in a reward of (−1). The script may then encounter an issue requiring it to wait (such as, for example, waiting for a user prompt, waiting for a calculation to complete, and the like). Thus, the script may change from "Running" 606 to "Waiting" 610 via transition 609, resulting in a reward of (−2). Once the script no longer needs to wait, it may resume, transitioning from "Waiting" 610 back to "Running" 606 via transition 611, resulting in a reward of (−1). However, should the script encounter another issue, it may undergo transition 609 again, resulting in another reward of (−2). If the script undergoes transitions 609 and 611 enough times, it may accumulate enough (−1) and (−2) rewards such that, even if the script eventually undergoes transitions 607 and 615 (meaning the script completed successfully), its final score may be below that of the second script's score of (−11), even though the second script failed.

In order to address this possibility, a system may enforce execution rules pertaining to the execution of the scripts. For example, a system may enforce a maximum wait time (e.g., a maximum length of time a script may spend in the "Waiting" state 610 before being "Terminated" 618). In some instances, a system may also enforce a maximum number of waits. For example, a system may allow a maximum of 5 waits. A fifth script being evaluated by such a system may undergo transitions 609 and 611 5 times each. Should the fifth script again undergo transition 609 to "Waiting" 610, constituting a sixth wait, the system may automatically terminate the script. Other approaches are also considered, such as dynamic rewards. For example, a reward associated with transition 609 may decrease with subsequent occurrences. As a clarifying example, a script undergoing transition 609 for a first time may receive a reward of (−2). Should the script return to "Running" (via transition 611) and need to wait again, undergoing transition 609 for a second time, the reward may be reduced by one, resulting in a reward of (−3).

Once all candidate scripts have been evaluated and scored, they may be presented to a user to enable the user to select a script to implement. This presentation may be in the form of a user interface (UI), displaying various statistics and other information the user may wish to review, such as a transition path, a number of commands replaced, whether the candidate script was a sample script, selected script, or optimized script, etc.

Figure 7:
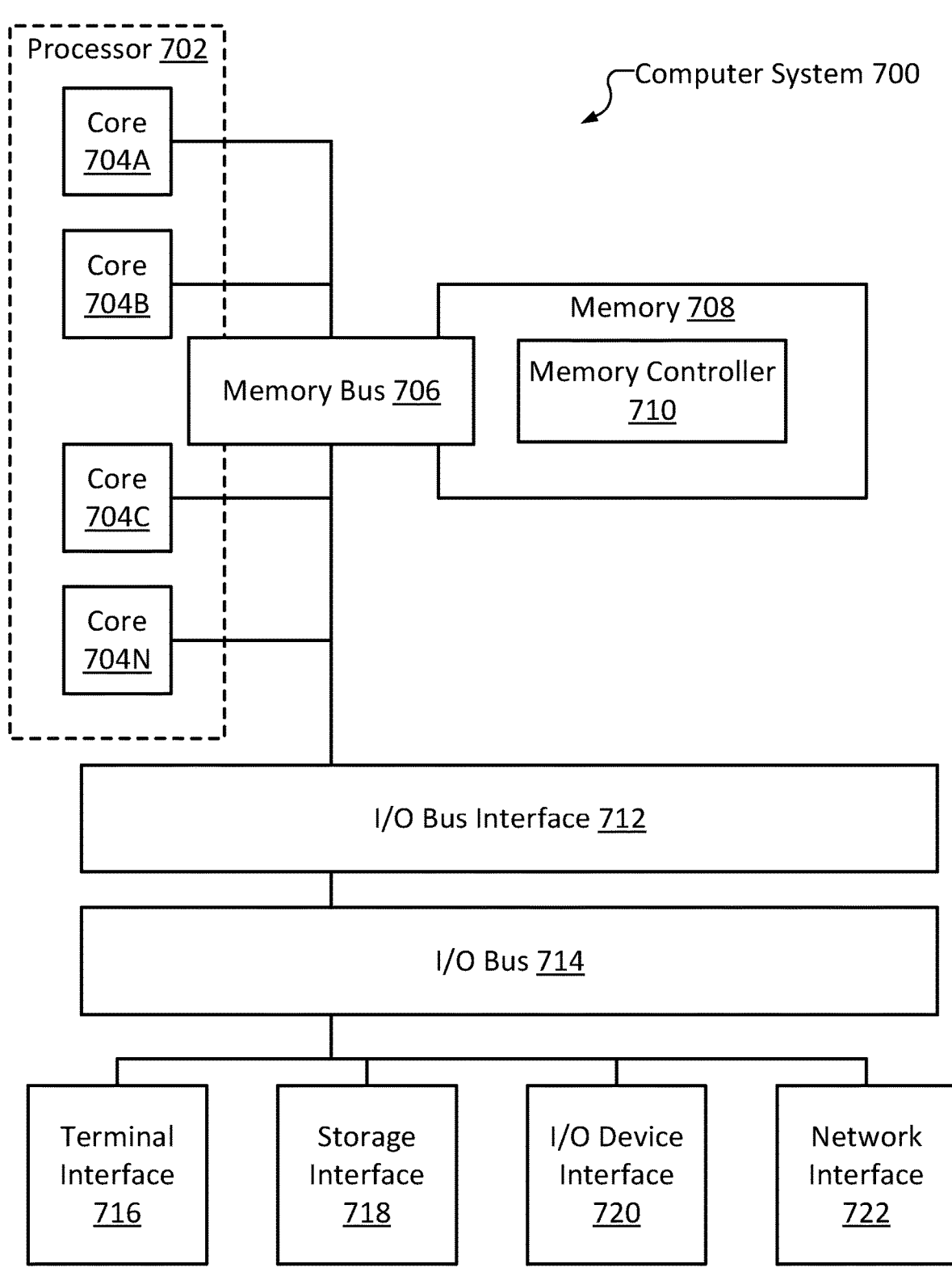
FIG. 7 illustrates a high-level block diagram of an example computer system that may be used in implementing embodiments of the present disclosure.

Referring now to FIG. 7, shown is a high-level block diagram of an example computer system 700 that may be configured to perform various aspects of the present disclosure, including, for example, methods 100, 200, 300, and 500. The example computer system 700 may be used in implementing one or more of the methods or modules, and any related functions or operations, described herein (e.g., using one or more processor circuits or computer processors of the computer), in accordance with embodiments of the present disclosure. In some embodiments, the major components of the computer system 700 may comprise one or more processors 702 (such as, for example, one or more central processing units (CPUs)), a memory subsystem 708, a terminal interface 716, a storage interface 718, an I/O (Input/Output) device interface 720, and a network interface 722, all of which may be communicatively coupled, directly or indirectly, for inter-component communication via a memory bus 706, an I/O bus 714, and an I/O bus interface unit 712.

The computer system 700 may contain one or more general-purpose programmable central processing units (CPUs) 702, some or all of which may include one or more cores 704A, 704B, 704C, and 704N, herein generically referred to as the CPU 702. In some embodiments, the computer system 700 may contain multiple processors typical of a relatively large system; however, in other embodiments the computer system 700 may alternatively be a single CPU system. Each CPU 702 may execute instructions stored in the memory subsystem 708 on a CPU core 704 and may comprise one or more levels of on-board cache.

In some embodiments, the memory subsystem 708 may comprise a random-access semiconductor memory, storage device, or storage medium (either volatile or non-volatile) for storing data and programs. In some embodiments, the memory subsystem 708 may represent the entire virtual memory of the computer system 700 and may also include the virtual memory of other computer systems coupled to the computer system 700 or connected via a network. The memory subsystem 708 may be conceptually a single monolithic entity, but, in some embodiments, the memory subsystem 708 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 708 may contain elements for control and flow of memory used by the CPU 702. This may include a memory controller 710.

Although the memory bus 706 is shown in FIG. 7 as a single bus structure providing a direct communication path among the CPU 702, the memory subsystem 708, and the I/O bus interface 712, the memory bus 706 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 712 and the I/O bus 714 are shown as single respective units, the computer system 700 may, in some embodiments, contain multiple I/O bus interface units 712, multiple I/O buses 714, or both. Further, while multiple I/O interface units are shown, which separate the I/O bus 714 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 700. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:

receiving a problem statement describing a problem;

receiving a sample solution script from a user;

selecting, based on the sample solution script, a selected solution script;

compiling a list of candidate scripts, the list including the sample solution script and the selected solution script;

optimizing the candidate scripts by replacing at least one command in a candidate script with an alternative command from a command mapping database, wherein the command mapping database comprises at least one entry for a given command, wherein the at least one entry comprises a timestamp denoting the given command has been searched and a lack of an alternative command for the given command in response to searching for the given command in a predefined resource, wherein the at least one entry having the timestamp prevents a redundant search for the given command in the predefined resource;

identifying execution rules for each of the candidate scripts;

executing each of the candidate scripts in a simulation based on the execution rules;

scoring, based on the simulation and the execution rules, performance of each of the candidate scripts in addressing the problem, resulting in scored candidate scripts; and presenting the scored candidate scripts;

wherein the simulating includes: defining a state-transition-reward routine; setting a first set of state checkpoints in a first script included within the candidate scripts; replicating a production environment, resulting in a replicated environment; and executing the first script within the replicated environment, the executing including:

executing a command included in the first script;

detecting a first state checkpoint included within the first set of state checkpoints; and determining, in response to the detecting, a state of the first script, wherein, for the first script, the scoring is based further on a reward associated with a transition defined in the state-transition-reward routine, the transition associated with the state and a previous state, wherein the reward is a negative value applied to the transition, wherein the scoring comprises summing the negative value for occurrences of the transition to result in a final score for the first script, wherein a second script within the candidate scripts has another final score, wherein the state is one of a plurality of states comprising a ready state, a running state, a waiting state, a completed state, a terminated state, a succeeded state, and a failed state such that the reward is according to the transition among the plurality of states, wherein the negative value for the transition to the waiting state is more negative than the negative value for the transition to the running state, the completed state, or the succeeded state, wherein the negative value for the transition to the terminated state is more negative than the negative value for the transition to the waiting state, wherein the negative value for the transition to the failed state is more negative than the negative value for the transition the terminated state.

2. The method of claim 1, further comprising:

querying, based on the sample solution script, an external resource on the Internet identified in a knowledge base;

receiving, in response to the query, one or more found scripts; and evaluating similarity of the one or more found scripts to the sample solution script, wherein:

the selecting is based on the evaluating; and the selected solution script is included in a set of found scripts of the one or more found scripts.

3. The method of claim 2, wherein, for a first found script included in the set of found scripts, the evaluating includes:

comparing the first found script to the sample solution script; and calculating, based on the comparing, a similarity score for the first found script, wherein the selecting is based further on the similarity score.

4. The method of claim 2, wherein the querying is performed via one or more Natural Language Processing (NLP) techniques based further on information included in a knowledge base.

5. The method of claim 1, further comprising optimizing the candidate scripts, the optimizing including, for a first script included in the candidate scripts:

extracting a first set of commands of the first script, the first set of commands including a first command;

determining that the first command is listed in an entry included in the command mapping database;

identifying, based on the first command and the entry included in the command mapping database, a first preferable alternative command; and modifying the first script, the modifying including:

removing the first command from the first script; and inserting the first preferable alternative command into the first script, resulting in a first optimized script.

6. The method of claim 5, wherein the optimizing further includes, for a second script included in the candidate scripts:

extracting a second set of commands of the second script, the second set of commands including a second command;

determining that the second command is not listed in the command mapping database;

searching, based on the determining that the second command is not listed in the command mapping database, an external resource for preferable alternative commands;

identifying, based on the searching, a second preferable alternative command;

updating, based on the second preferable alternative command, the command mapping database; and modifying the second script, the modifying including:

removing the second command from the second script; and inserting the second preferable alternative command into the second script, resulting in a second optimized script.

7. A system comprising:

a memory; and a central processing unit (CPU) coupled to the memory, the CPU configured to:

receive a problem statement describing a problem;

receive a sample solution script from a user;

select, based on the sample solution script, a selected solution script;

compile a list of candidate scripts, the list including the sample solution script and the selected solution script;

optimizing the candidate scripts by replacing at least one command in a candidate script with an alternative command from a command mapping database, wherein the command mapping database comprises at least one entry for a given command, wherein the at least one entry comprises a timestamp denoting the given command has been searched and a lack of an alternative command for the given command in response to searching for the given command in a predefined resource, wherein the at least one entry having the timestamp prevents a redundant search for the given command in the predefined resource;

identify execution rules of each of the candidate scripts;

executing each of the candidate scripts based on the execution rules;

score, based on the simulation and the execution rules, performance of each of the candidate scripts in addressing the problem, resulting in scored candidate scripts; and present the scored candidate scripts;

wherein the simulating includes: defining a state-transition-reward routine; setting a first set of state checkpoints in a first script included within the candidate scripts; replicating a production environment, resulting in a replicated environment; and executing the first script within the replicated environment, the executing including:

executing a command included in the first script;

detecting a first state checkpoint included within the first set of state checkpoints; and determining, in response to the detecting, a state of the first script, wherein, for the first script, the scoring is based further on a reward associated with a transition defined in the state-transition-reward routine, the transition associated with the state and a previous state, wherein the reward is a negative value applied to the transition, wherein the scoring comprises summing the negative value for occurrences of the transition to result in a final score for the first script, wherein a second script within the candidate scripts has another final score, wherein the state is one of a plurality of states comprising a ready state, a running state, a waiting state, a completed state, a terminated state, a succeeded state, and a failed state such that the reward is according to the transition among the plurality of states, wherein the negative value for the transition to the waiting state is more negative than the negative value for the transition to the running state, the completed state, or the succeeded state, wherein the negative value for the transition to the terminated state is more negative than the negative value for the transition to the waiting state, wherein the negative value for the transition to the failed state is more negative than the negative value for the transition the terminated state.

8. The system of claim 7, wherein the CPU is further configured to:

query, based on the sample solution script, an external resource on the Internet identified in a knowledge base;

receive, in response to the query, one or more found scripts; and evaluate similarity of the one or more found scripts to the sample solution script, wherein:

the selecting is based on the evaluating; and the selected solution script is included in a set of found scripts of the one or more found scripts.

9. The system of claim 8, wherein, for a first found script included in the set of found scripts, the evaluating includes:

comparing the first found script to the sample solution script; and calculating, based on the comparing, a similarity score for the first found script, wherein the selecting is based further on the similarity score.

10. The system of claim 8, wherein the querying is performed via one or more Natural Language Processing (NLP) techniques based further on information included in a knowledge base.

11. The system of claim 7, wherein the CPU is further configured to optimize the candidate scripts, the optimizing including, for a first script included in the candidate scripts:

extracting a first set of commands of the first script, the first set of commands including a first command;

determining that the first command is listed in an entry included in the command mapping database;

identifying, based on the first command and the entry included in the command mapping database, a first preferable alternative command; and modifying the first script, the modifying including:

removing the first command from the first script; and inserting the first preferable alternative command into the first script, resulting in a first optimized script.

12. The system of claim 11, wherein the optimizing further includes, for a second script included in the candidate scripts:

extracting a second set of commands of the second script, the second set of commands including a second command;

determining that the second command is not listed in the command mapping database;

searching, based on the determining that the second command is not listed in the command mapping database, an external resource for preferable alternative commands;

identifying, based on the searching, a second preferable alternative command;

updating, based on the second preferable alternative command, the command mapping database; and modifying the second script, the modifying including:

removing the second command from the second script; and inserting the second preferable alternative command into the second script, resulting in a second optimized script.

13. A computer program product, the computer program product comprising a computer readable storage medium having program instructions embodied therewith, the program instructions executable by a computer to cause the computer to:

receive a problem statement describing a problem;

receive a sample solution script from a user;

select, based on the sample solution script, a selected solution script;

compile a list of candidate scripts, the list including the sample solution script and the selected solution script;

optimize the candidate scripts by replacing at least one command in a candidate script with an alternative command from a command mapping database, wherein the command mapping database comprises at least one entry for a given command, wherein the at least one entry comprises a timestamp denoting the given command has been searched and a lack of an alternative command for the given command in response to searching for the given command in a predefined resource, wherein the at least one entry having the timestamp prevents a redundant search for the given command in the predefined resource;

identify execution rules of each of the candidate scripts;

execute each of the candidate scripts in a simulation based on the execution rules;

score, based on the simulation and the execution rules, performance of each of the candidate scripts in addressing the problem, resulting in scored candidate scripts; and present the scored candidate scripts;

wherein the simulating includes: defining a state-transition-reward routine; setting a first set of state checkpoints in a first script included within the candidate scripts; replicating a production environment, resulting in a replicated environment; and executing the first script within the replicated environment, the executing including:

executing a command included in the first script;

detecting a first state checkpoint included within the first set of state checkpoints; and determining, in response to the detecting, a state of the first script, wherein, for the first script, the scoring is based further on a reward associated with a transition defined in the state-transition-reward routine, the transition associated with the state and a previous state, wherein the reward is a negative value applied to the transition, wherein the scoring comprises summing the negative value for occurrences of the transition to result in a final score for the first script, wherein a second script within the candidate scripts has another final score, wherein the state is one of a plurality of states comprising a ready state, a running state, a waiting state, a completed state, a terminated state, a succeeded state, and a failed state such that the reward is according to the transition among the plurality of states, wherein the negative value for the transition to the waiting state is more negative than the negative value for the transition to the running state, the completed state, or the succeeded state, wherein the negative value for the transition to the terminated state is more negative than the negative value for the transition to the waiting state, wherein the negative value for the transition to the failed state is more negative than the negative value for the transition the terminated state.

14. The computer program product of claim 13, wherein the instructions further cause the computer to:

query, based on the sample solution script, an external resource on the Internet identified in a knowledge base;

receive, in response to the query, one or more found scripts; and evaluate similarity of the one or more found scripts to the sample solution script, wherein:

the selecting is based on the evaluating; and the selected solution script is included in a set of found scripts of the one or more found scripts.

15. The computer program product of claim 14, wherein, for a first found script included in the set of found scripts, the evaluating includes:

comparing the first found script to the sample solution script; and calculating, based on the comparing, a similarity score for the first found script, wherein the selecting is based further on the similarity score.

16. The computer program product of claim 13, wherein the instructions further cause the computer to optimize the candidate scripts, the optimizing including, for a first script included in the candidate scripts:

extracting a first set of commands of the first script, the first set of commands including a first command;

determining that the first command is listed in an entry included in the command mapping database;

identifying, based on the first command and the entry included in the command mapping database, a first preferable alternative command; and modifying the first script, the modifying including:

removing the first command from the first script; and inserting the first preferable alternative command into the first script, resulting in a first optimized script.

17. The computer program product of claim 16, wherein the optimizing further includes, for a second script included in the candidate scripts:

extracting a second set of commands of the second script, the second set of commands including a second command;

determining that the second command is not listed in the command mapping database;

searching, based on the determining that the second command is not listed in the command mapping database, an external resource for preferable alternative commands;

identifying, based on the searching, a second preferable alternative command;

updating, based on the second preferable alternative command, the command mapping database; and modifying the second script, the modifying including:

removing the second command from the second script; and inserting the second preferable alternative command into the second script, resulting in a second optimized script.

* * * * *